US008749213B2

(12) United States Patent
Chen

(10) Patent No.: US 8,749,213 B2
(45) Date of Patent: Jun. 10, 2014

(54) MIXED MODE CONTROL FOR SWITCHING REGULATOR WITH FAST TRANSIENT RESPONSES

(75) Inventor: Wei Chen, Saratoga, CA (US)

(73) Assignees: Silergy Technology, Sunnyvale, CA (US); Silergy Semiconductor Technology (Hangzhou) Ltd, Hangzhou (CN)

( * ) Notice: Subject to any disclaimer, the term of this patent is extended or adjusted under 35 U.S.C. 154(b) by 780 days.

(21) Appl. No.: 12/455,978

(22) Filed: Jun. 9, 2009

(65) Prior Publication Data

US 2010/0308654 A1    Dec. 9, 2010

(51) Int. Cl.
G05F 1/575 (2006.01)
G05F 1/577 (2006.01)

(52) U.S. Cl.
USPC ............................ 323/267; 323/272; 323/283

(58) Field of Classification Search
USPC .......... 323/222, 267, 272, 282, 283, 284, 271
See application file for complete search history.

(56) References Cited

U.S. PATENT DOCUMENTS

| | | | | |
|---|---|---|---|---|
| 5,003,454 | A | * | 3/1991 | Bruning ........................... 363/81 |
| 5,617,015 | A | * | 4/1997 | Goder et al. ..................... 323/282 |
| 6,249,447 | B1 | * | 6/2001 | Boylan et al. .................... 363/97 |
| 6,437,545 | B2 | * | 8/2002 | Sluijs .............................. 323/222 |
| 6,756,771 | B1 | * | 6/2004 | Ball et al. ........................ 323/222 |
| 7,508,176 | B2 | * | 3/2009 | Hartular et al. ................. 323/268 |
| 8,049,472 | B2 | * | 11/2011 | Easwaran et al. ............. 323/267 |
| 2002/0180410 | A1 | * | 12/2002 | Brooks .......................... 323/282 |
| 2005/0007083 | A1 | * | 1/2005 | Yang et al. ..................... 323/282 |
| 2005/0110474 | A1 | * | 5/2005 | Ortiz et al. ..................... 323/282 |
| 2008/0231115 | A1 | * | 9/2008 | Cho et al. ........................ 307/41 |
| 2008/0238396 | A1 | | 10/2008 | Ng et al. |
| 2008/0297128 | A1 | * | 12/2008 | Xu et al. ........................ 323/282 |
| 2008/0303501 | A1 | * | 12/2008 | Prodic ............................ 323/283 |
| 2009/0212751 | A1 | * | 8/2009 | Cervera et al. ................ 323/268 |

OTHER PUBLICATIONS

Wing-Hung Ki; Dongsheng Ma; "Single-inductor multiple-output switching converters," Power Electronics Specialists Conference, 2001. PESC. 2001 IEEE 32nd Annual, vol. 1, pp. 226-231. doi: 10.1109/PESC.2001.954024 URL: http://ieeexplore.ieee.org/stamp/stamp.jsp?tp=&arnumber=954024&isnumber=20624.*
Dongsheng Ma, et al.; "A 1.8 V single-inductor dual-output switching converter for power reduction techniques," VLSI Circuits, 2001. Digest of Technical Papers. 2001 Symposium on,pp. 137-140. doi: 10.1109/VLSIC.2001.934219 URL: http://ieeexplore.ieee.org/stamp/stamp.jsp?tp=&arnumber=934219&isnumber=20220.*

* cited by examiner

Primary Examiner — Adolf Berhane
Assistant Examiner — Fred E Finch, III
(74) Attorney, Agent, or Firm — Michael C. Stephens, Jr.

(57) ABSTRACT

Methods and circuits for power supply arrangement and control are disclosed herein. In one embodiment, a switching regulator controller can include: (i) a first feedback circuit for sensing an output of a switching regulator to compare against a regulation reference, and to generate a control signal suitable for matching the output of the switching regulator to the regulation reference during a steady state operation of the switching regulator; and (ii) a second feedback circuit for sensing a regulation difference between the output and the regulation reference, and to generate an adjustment signal in response to the regulation difference, where the adjustment signal adjusts the control signal under transient conditions to improve transient responses of said switching regulator.

20 Claims, 10 Drawing Sheets

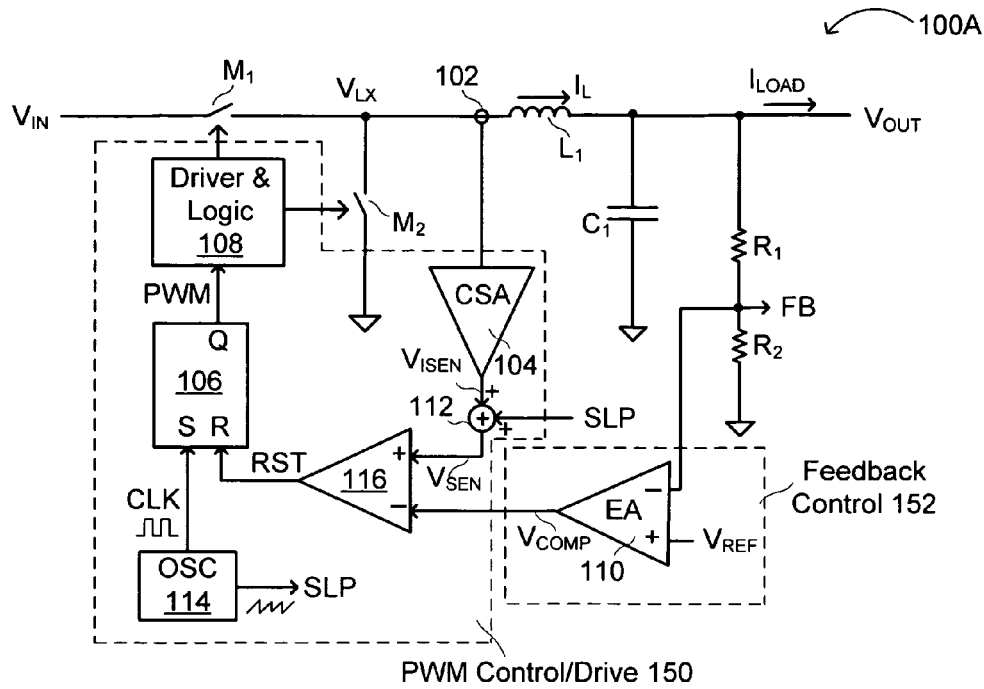
FIG. 1A (conventional)
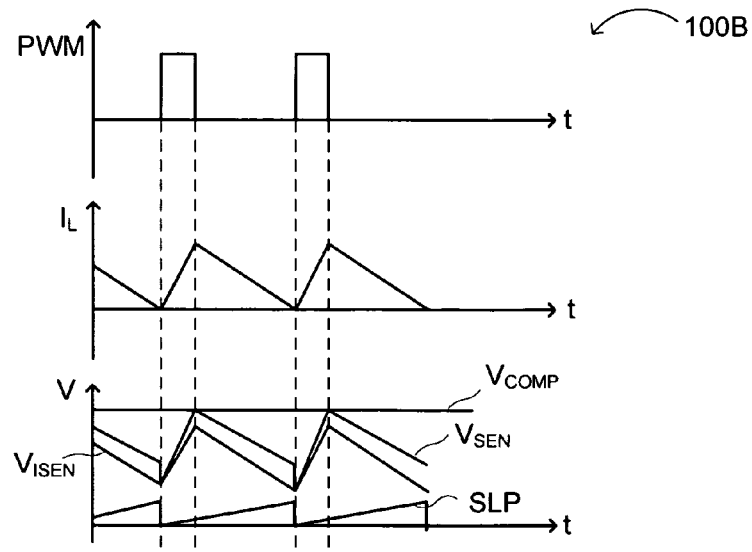
FIG. 1B (conventional)

MIXED MODE CONTROL FOR SWITCHING REGULATOR WITH FAST TRANSIENT RESPONSES

FIELD OF THE INVENTION

The present invention generally relates to the field of semiconductor devices. More specifically, embodiments of the present invention pertain to power regulation and control.

BACKGROUND

Voltage regulators, such as DC-to-DC voltage converters, are used to provide stable voltage sources for various electronic systems. Efficient DC-to-DC converters are particularly needed for battery management in low power devices (e.g., laptop notebooks, cellular phones, etc.). A switching voltage regulator generates an output voltage by converting an input DC voltage into a high frequency voltage, and then filtering the high frequency input voltage to generate the output DC voltage. Specifically, the switching regulator includes a switch for alternately coupling and decoupling an input DC voltage source (e.g., a battery) to a load (e.g., an integrated circuit (IC)). An output filter, typically including an inductor and a capacitor, may be coupled between the input voltage source and the load to filter the switch output, and thus provide the output DC voltage. A controller (e.g., a pulse width modulator (PWM), a pulse frequency modulator, etc.) can be used to control the switch to maintain a substantially constant output DC voltage.

Traditional switching regulators use a transconductance amplifier or operational amplifier as an error amplifier for amplifying a difference between an output feedback level and a reference level. To stabilize the regulation loop, a transfer function of such an error amplifier should be designed to accommodate the poles and zeroes in a regular power stage transfer function. However, the power stage transfer function in a switching regulator often varies with the operation conditions (e.g., input voltage, output current, etc.). Thus, the transfer function of the error amplifier might be conservatively designed in switching regulators to achieve good stability margin under all operation conditions, resulting in relatively poor transient responses.

SUMMARY

Embodiments of the present invention relate to power regulators and/or supplies with improved regulator control.

In one embodiment, a switching regulator controller can include: (i) a first feedback circuit for sensing an output of a switching regulator to compare against a regulation reference, and to generate a control signal suitable for matching the output of the switching regulator to the regulation reference during a steady state operation of the switching regulator; and (ii) a second feedback circuit for sensing a regulation difference between the output and the regulation reference, and to generate an adjustment signal in response to the regulation difference, where the adjustment signal adjusts the control signal under transient conditions to improve transient responses of the switching regulator.

In another embodiment, a multiple output switching regulator controller can include: (i) a power stage that powers a plurality of loads at a corresponding plurality of output terminals by converting an input signal; and (ii) a first feedback circuit that amplifies an output regulation difference between each output terminal and a corresponding regulation reference using time division multiplexing (TDM), where the first feedback circuit generates a plurality of control signals corresponding to each output terminal, and each control signal is generated during a predetermined time interval using TDM, and each control signal is held until a next sensing interval. Also, each control signal controls the switching regulator to match each output terminal to the corresponding regulation reference during a steady state operation of the switching regulator.

In another embodiment, a method of controlling a switching regulator can include: (i) amplifying a regulation difference between an output terminal and a regulation reference using a first feedback circuit; (ii) generating a control signal from the amplified difference for steady state operation of the switching regulator; (iii) sensing the regulation difference between the output terminal and the regulation reference using a second feedback circuit; and (iv) generating an adjustment signal for adjusting the control signal under transient conditions to improve a transient response of the switching regulator.

In another embodiment, a method of controlling a multiple output switching regulator can include: (i) dividing a sensing period into a plurality of time intervals; (ii) amplifying an output regulation difference between each of a plurality of output terminals and a corresponding regulation reference using a first common feedback circuit; (iii) generating a corresponding control signal in a corresponding time interval, where the corresponding control signal is held until a next sensing interval; and (iv) using each control signal to produce a stable output level at the corresponding output terminal to match the corresponding regulation reference during steady state operation.

Embodiments of the present invention can advantageously provide for mixed-mode control of power regulators and/or supplies, with improved transient responses. Particular embodiments can utilize first and second feedback controls, where the first feedback control is used for stable operation and output regulation under steady state conditions. This first feedback control can be relatively slow in response, but accurate in terms of meeting regulation requirements. The second feedback control may be used for relatively fast response control under transient conditions. These and other advantages of the present invention will become readily apparent from the detailed description of preferred embodiments below.

BRIEF DESCRIPTION OF THE DRAWINGS

FIG. 1A is a block schematic diagram of an example switching regulator.

FIG. 1B is a waveform diagram showing example operation of the regulator shown in FIG. 1A.

DETAILED DESCRIPTION

Figure 2A:
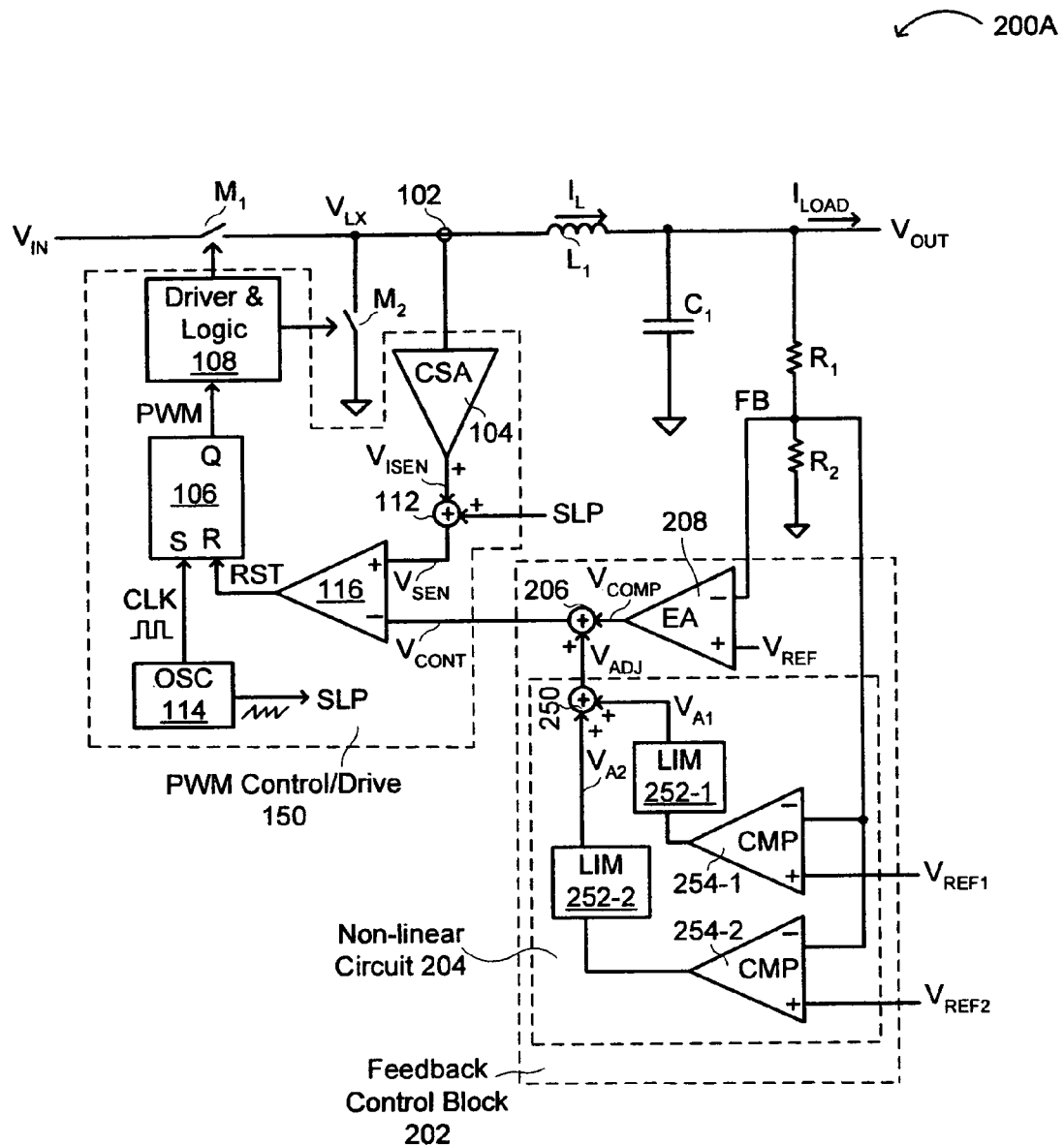
FIG. 2A is a block schematic diagram of an example switching regulator in accordance with embodiments of the present invention.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Embodiments of the present invention can advantageously provide for mixed-mode control of power regulators and/or supplies, with improved transient responses. Particular embodiments can utilize first and second feedback controls, where the first feedback control is used for stable operation and output regulation under steady state conditions. This first feedback control can be relatively slow in response, but accurate in terms of meeting regulation requirements. The second feedback control may be used for relatively fast response control under transient conditions. Further, embodiments of the present invention can utilize an error amplifier to achieve stable operation under steady state conditions, and a non-linear amplifier or other control loop to achieve fast responses under transient conditions. The invention, in its various aspects, will be explained in greater detail below with regard to exemplary embodiments.

Referring now to FIG. 1A, shown is a block schematic diagram 100A of an example switching regulator. FIG. 1B is a waveform diagram 100B showing example operation of the regulator shown in FIG. 1A. In fixed frequency operation, a clock (CLK) from oscillator 114 may be used to turn on the top switch (e.g., transistor $M_1$) via R-S flip-flop 106 and logic/driver circuit 108, thus starting a switching cycle. The output voltage can be sensed (e.g., via resister divider network $R_1$ and $R_2$) and compared (via output feedback signal, FB) against a regulation reference (e.g., $V_{REF}$) to generate an error signal $V_{COMP}$ via error amplifier (EA) 110. This error signal can be input to comparator 116 for comparison against the sum of a sensed inductor current (e.g., via current detector 102 and current sensing amplifier (CSA) 104) and a slope compensation signal (SLP). SLP can be a "sawtooth" signal that is in-phase with the CLK signal and is generated from oscillator 114. If $V_{SEN}$, the sum of the sensed inductor current and the slope compensation signal, exceeds the error signal $V_{COMP}$, the top switch $M_1$ may be turned off, and the rectifier or synchronous switch $M_2$ can conduct the current, lasting until the next CLK arrives.

The example switching regulator of FIG. 1A includes a power stage, PWM control/drive 150, and feedback control 152. Feedback control 152 senses output voltage $V_{OUT}$ for comparison against regulation reference voltage $V_{REF}$ to generate an error signal (e.g., $V_{COMP}$). $V_{COMP}$ is fed into PWM control/drive 150 to generate the driving signals for power switches $M_1$ and $M_2$. Feedback control 152 thus includes EA 110 with a corresponding compensation network (not shown) to produce compensation for stabilization of the feedback loop. However, the power stage transfer function varies with operating conditions, and the compensation design may therefore be relatively conservative to meet worst case condition stability requirements. As a result, transient responses may be relatively slow in this type of control architecture. However, particular embodiments include methods and circuits to achieve both good stability and fast transient responses.

Exemplary Switching Regulator Control Structure

In one example, a switching regulator controller includes: (i) a first feedback circuit for sensing an output of a switching regulator to compare against a regulation reference, and to generate a control signal suitable for matching the output of the switching regulator to the regulation reference during a steady state operation of the switching regulator; and (ii) a second feedback circuit for sensing a regulation difference between the output and the regulation reference, and to generate an adjustment signal in response to the regulation difference, where the adjustment signal adjusts the control signal under transient conditions to improve transient responses of the switching regulator. In some examples shown in the following discussion, the first feedback circuit uses a linear circuit (e.g., linear amplifiers), and the second feedback circuit uses a non-linear circuit (e.g., multiple comparators with multiple thresholds). However, the first feedback circuit can also be a non-linear circuit with non-linear transfer functions, and the second feedback circuit can also be a linear circuit with linear transfer functions.

Referring now to FIG. 2A, shown is a block schematic diagram 200A of an example switching regulator in accordance with embodiments of the present invention. Feedback control block 202 can be divided into a linear amplifier portion (e.g., including EA 208) for accurate DC or steady state regulation control, and non-linear circuit 204 suitable for fast response under transient conditions. Linear amplifier EA 208 can amplify a difference between DC output voltage $V_{OUT}$ and regulation reference $V_{REF}$ to achieve accurate and stable regulation at $V_{OUT}$ under steady state operation. For example, $V_{REF}$ can range from about 0.1V to about 5V, or a maximum voltage in the system, and including about 0.6V. This linear amplifier portion may be optimized for stability and regulation accuracy, and can be relatively slow in response. As a result, the linear amplifier portion as shown in FIG. 2A may be relatively easy to design and implement. For example, a simple low bandwidth integrator can also be used as an alternative.

In contrast, non-linear circuit 204 can include several relatively fast sub-circuits to manage transient conditions on the load. In the particular example of FIG. 2A, two comparators (e.g., 254-1 and 254-2) can be utilized. When output feedback signal FB is lower than a first threshold (e.g., $V_{REF1}$), comparator 254-1 may generate a positive output, which can then be filtered by LIM 252-1, and then added onto $V_{COMP}$, the output of EA 208, by summation circuit 206. $V_{REF1}$ can be set to slightly lower than $V_{REF}$, such as from about 90% to about 98% of $V_{REF}$, and including about 97% of $V_{REF}$. Resulting control signal $V_{CONT}$ can then increase a duty cycle of the power stage to produce a fast response to the load transient step. Similarly, when FB is greater than a second threshold, (e.g., $V_{REF2}$), comparator 254-2 and LIM 252-2 can force a duty cycle of the power stage to decrease, thus achieving relatively good output response. $V_{REF1}$ can be set to slightly above $V_{REF}$, such as from about 102% to about 110% of $V_{REF}$, and including about 103% of $V_{REF}$.

Figure 2B:
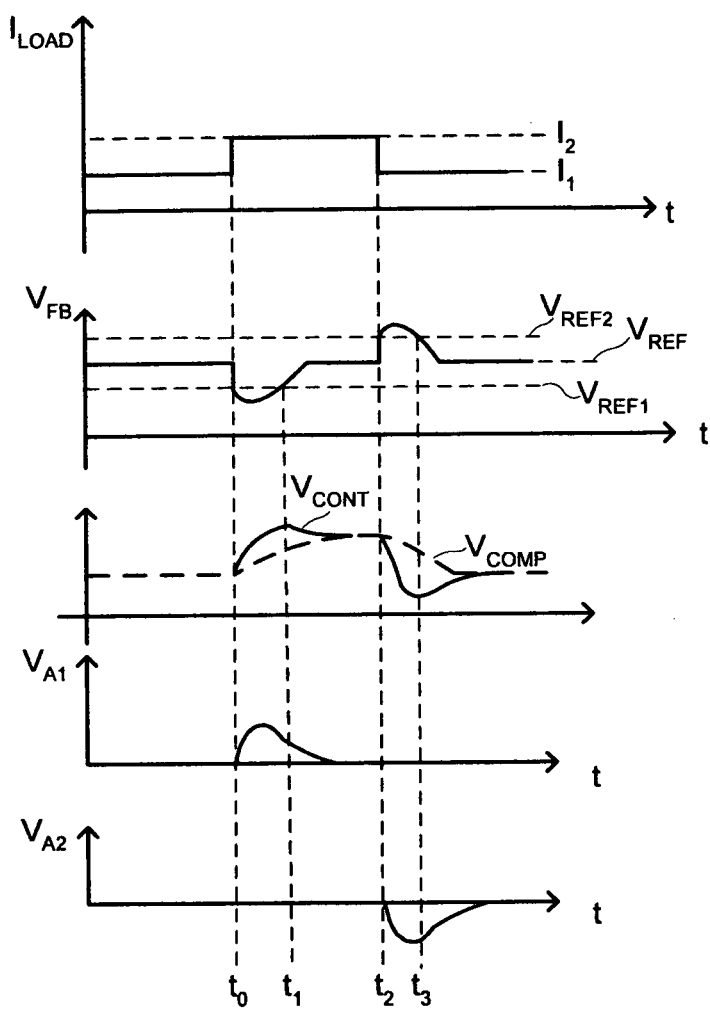
FIG. 2B is a waveform diagram showing example operation of the regulator shown in FIG. 2A.

FIG. 2B is a waveform diagram 200B showing example operation of the regulator shown in FIG. 2A. At $t_0$, the output load can increase from $I_1$ to $I_2$, resulting in a dip in the output voltage, which is reflected at $V_{FB}$. Linear amplifier output $V_{COMP}$ may respond slowly, but comparator 254-1 can generate a positive pulse $V_{A1}$ to increase the duty cycle and quickly increase $V_{OUT}$ and $V_{FB}$ toward steady state values via more aggressive control signal $V_{CONT}$. At $t_1$, $V_{FB}$ can increase within the regulation band. The non-linear loop may gradually stop functioning, and the linear amplifier can maintain steady state regulation. The duration of such non-linear circuit 204 operation can be controlled by LIM 252-1.

Similarly, when the load decreases from $I_2$ to $I_1$, comparator 254-2 and LIM 252-2 can perform a non-linear modulation function to quickly decrease $V_{OUT}$ and $V_{FB}$ toward steady state values via more aggressive control signal $V_{CONT}$. Also, outputs from LIM 252-1 (e.g., $V_{A1}$) and LIM 252-2 (e.g., $V_{A2}$) can be summed by summation circuit 250 to produce adjustment signal $V_{ADJ}$. Limiting (LIM) circuits 252 can be any suitable circuitry for processing comparator 254 outputs (e.g., gain filters, time duration limiters, amplitude limiters, or other suitable limiters, etc.). Further, while this particular example uses only two thresholds and two comparators to realize a non-linear circuit, any suitable number (e.g., more than two thresholds and two comparators) can be used to further speed up the transient responses.

Figure 2C:
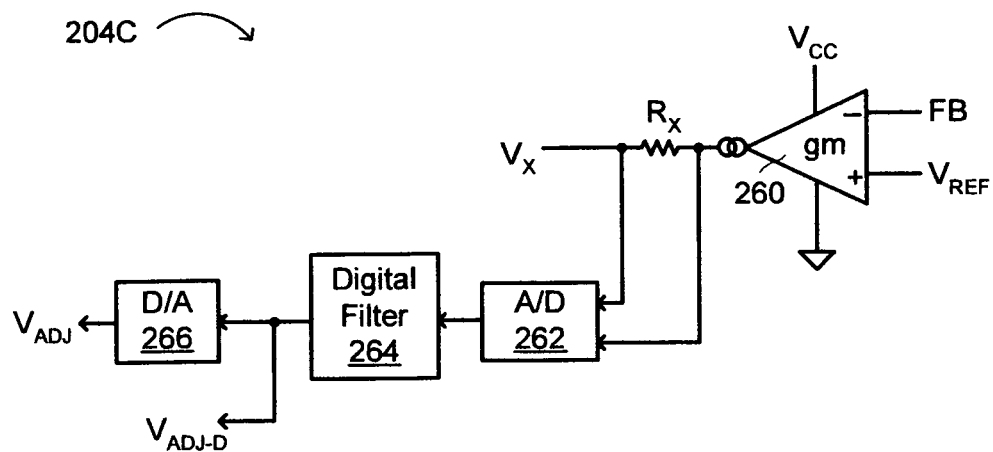
FIG. 2C is a block schematic diagram of a first example non-linear circuit in accordance with embodiments of the present invention.

Referring now to FIG. 2C, shown is a block schematic diagram 204C of a first example non-linear circuit in accordance with embodiments of the present invention. This approach represents a digital based implementation of non-linear circuit 204. Here, an error signal between FB and regulation reference $V_{REF}$ can be sampled (e.g., via transconductance amplifier 260 and resistor $R_X$) and converted into a digital signal (e.g., via analog-to-digital (A/D) converter 262). Digital filter 264 may then be used to process a digital output from A/D converter 262 to calculate adjustment signal $V_{ADJ-D}$. Then, $V_{ADJ-D}$ may be converted back to an analog signal (e.g., via digital-to-analog (D/A) converter 266) to provide $V_{ADJ}$ for summation with a linear amplifier output for PWM control. Alternatively, digital signal $V_{ADJ-D}$ may be fed into driver logic (e.g., 108) to supplement control signal PWM for active switch (e.g., $M_1$ and $M_2$) duty cycle modulation in some control architectures. In addition, digital filter 264 can be programmed or reconfigured by user interface control.

Figure 2D:
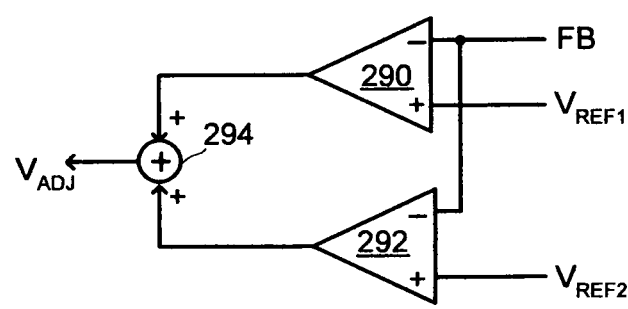
FIG. 2D is a block schematic diagram of a second example non-linear circuit in accordance with embodiments of the present invention.

Referring now to FIG. 2D, shown is a block schematic diagram 204D of a second example non-linear circuit in accordance with embodiments of the present invention. In this example, non-linear circuit 204 can be implemented using multiple amplifiers. Amplifier 290 can be used to amplify a difference between FB and first threshold $V_{REF1}$ to adjust control signal $V_{CONT}$ into PWM control/drive block 150. Amplifier 292 can be used to amplify a difference between FB and second threshold $V_{REF2}$ to adjust control signal $V_{CONT}$ into PWM control/drive block 150. In addition, outputs from amplifiers 290 and 292 can be combined via summation circuit 294 to provide adjustment signal $V_{ADJ}$. Further, any suitable number of amplifiers and thresholds (e.g., more than two amplifiers with different transfer functions and more than two thresholds) can be used to further optimize stability and transient responses.

Exemplary Multiple Output Switching Regulator Control Structure

In one example, a multiple output switching regulator controller includes: (i) a power stage that powers a plurality of loads at a corresponding plurality of output terminals by converting an input signal; and (ii) a first feedback circuit that amplifies an output regulation difference between each output terminal and a corresponding regulation reference using time division multiplexing (TDM), where the first feedback circuit generates a plurality of control signals corresponding to each output terminal, and each control signal is generated during a predetermined time interval using TDM, and each control signal is held until a next sensing interval. Also, each control signal controls the switching regulator to match each output terminal to the corresponding regulation reference during a steady state operation of the switching regulator. In some examples shown in the following discussion, the first feedback circuit uses a linear circuit (e.g., linear amplifiers), but the first feedback circuit can also be a non-linear circuit including comparators, or a sum of both linear and non-linear circuits.

Figure 3A:
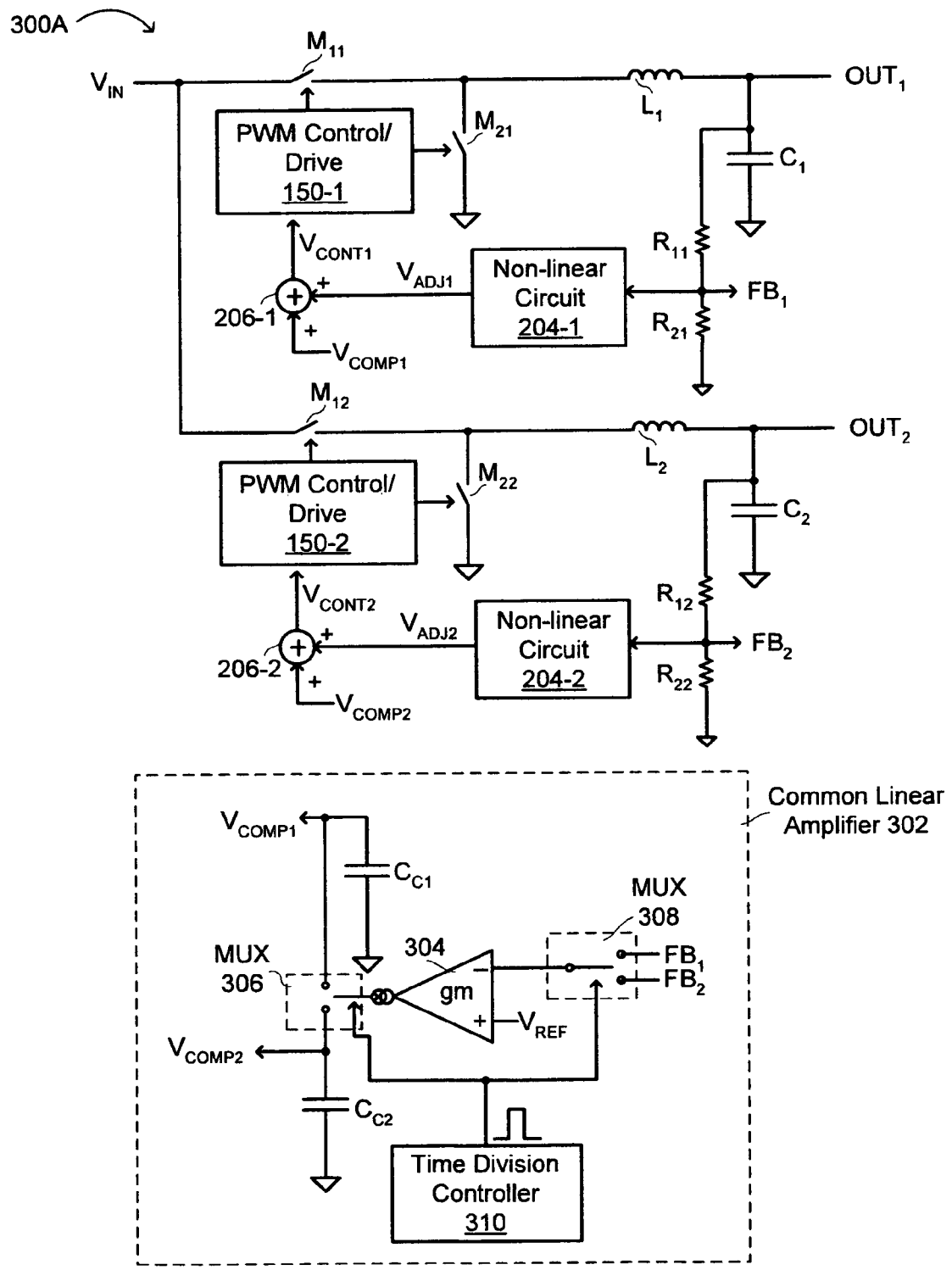
FIG. 3A is a block schematic diagram of an example regulator for two outputs in accordance with embodiments of the present invention.

Referring now to FIG. 3A, shown is a block schematic diagram 300A of an example regulator for two outputs in accordance with embodiments of the present invention. This particular arrangement of non-linear circuit 204 can effectively increase a transient response speed in the multi-output regulator while minimizing hardware overhead by sharing the relatively slow response circuitry. In this example, output loops for $OUT_1$ (e.g., including non-linear circuit 204-1, summation circuit 206-1, and PWM control/drive 150-1 for controlling active switches $M_{11}$ and $M_{21}$) and $OUT_2$ (e.g., including non-linear circuit 204-2, summation circuit 206-2, and PWM control/drive 150-2 for controlling active switches $M_{12}$ and $M_{22}$) can share a same relatively slow common linear amplifier loop 302 for accurate and stable DC regulation.

Because common linear amplifier 302 may be relatively slow, time division multiplexing (TDM) may be used (e.g., via time division controller 310) to generate a DC error signal for each output (e.g., $OUT_1$ and $OUT_2$) by multiplexing inputs (e.g., $FB_1$ and $FB_2$) and outputs of the common error amplifiers among different channels. For example, during a first time interval, MUX 306 can connect a transconductance amplifier 304 output to a first compensation capacitor $C_{C1}$, thus integrating an error between $FB_1$ and regulation reference $V_{REF}$ via MUX 308. Similarly, MUX 306 can connect a transconductance amplifier 304 output to a second compensation capacitor $C_{C2}$, thus integrating an error between $FB_2$ and $V_{REF}$ via MUX 308. Voltages (e.g., $V_{COMP1}$ and $V_{COMP2}$) on each compensation capacitor can then be used to achieve proper steady state regulation on the corresponding output (e.g., $OUT_1$ and $OUT_2$). Under transient operating conditions, non-linear circuits 204 can sense a corresponding output voltage, and modulate a voltage (e.g., $V_{ADJ1}$ and $V_{ADJ2}$) to generate a relatively fast control voltage (e.g., $V_{CONT1}$ and $V_{CONT2}$) in order to change the duty cycle of the associated power stage and achieve good output transient response.

Figure 3B:
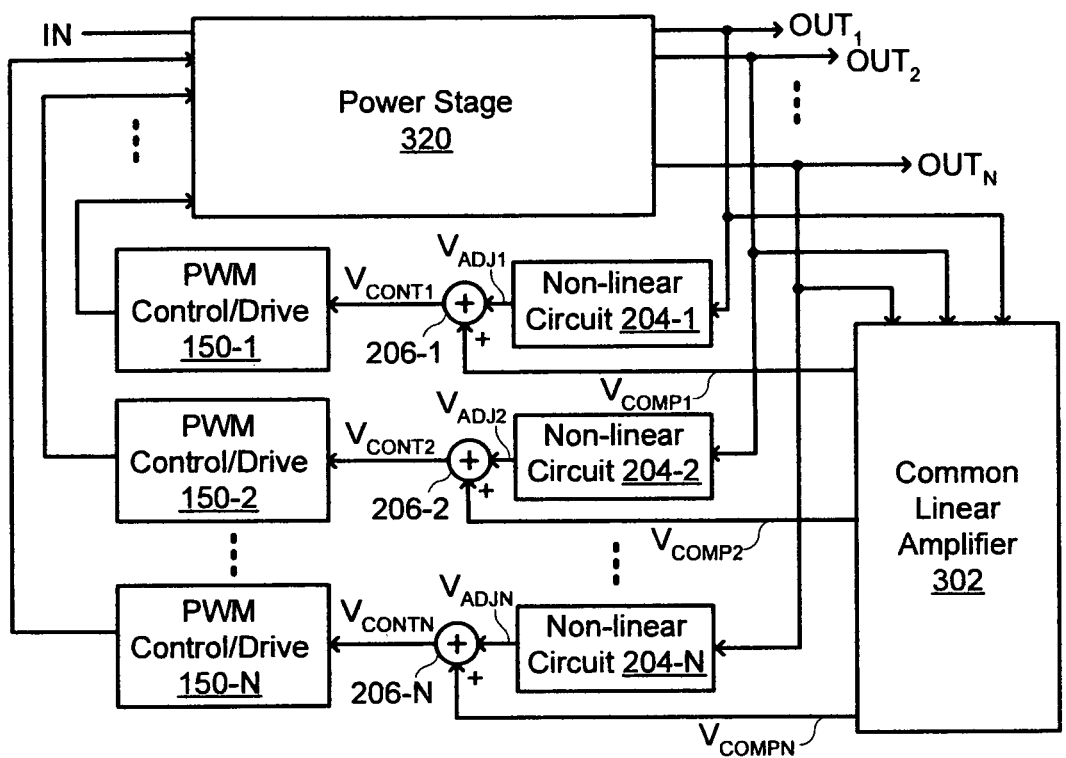
FIG. 3B is a block schematic diagram of a first example regulator for N outputs in accordance with embodiments of the present invention.

Referring now to FIG. 3B, shown is a block schematic diagram 300B of a first example regulator for N outputs in accordance with embodiments of the present invention. This example regulator can include power stage 320 (e.g., active switches $M_1$ and $M_2$, inductors, etc.), common linear amplifier 302, PWM control/drive 150 for each output channel (e.g., for $OUT_1, OUT_2, \ldots OUT_N$), and non-linear circuit 204 for each channel.

Figure 3C:
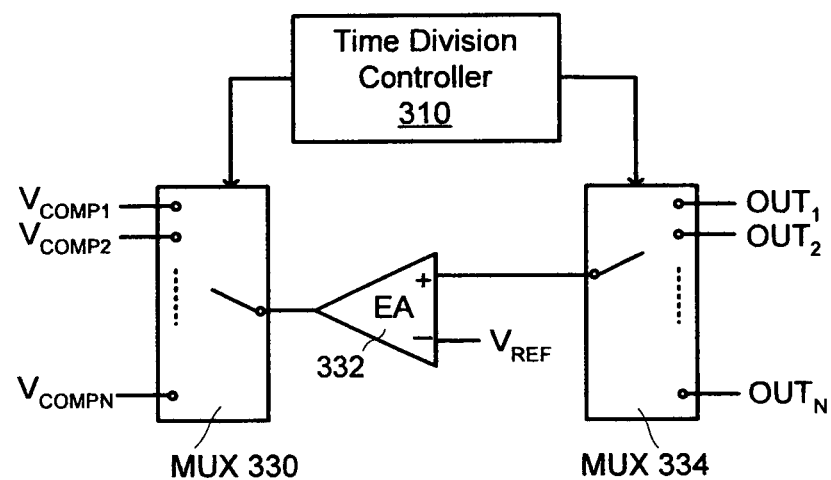
FIG. 3C is a block schematic diagram of an example common linear amplifier in accordance with embodiments of the present invention.

Referring now to FIG. 3C, shown is a block schematic diagram 302C of an example common linear amplifier in accordance with embodiments of the present invention. In such a multi-output system, when slower transient speeds can be tolerated, non-linear control can also be shared among all channels (e.g., 1, 2, ... N) with suitable time division and multiplexing switches MUX 330 and MUX 334, as well as EA 332.

Figure 3D:
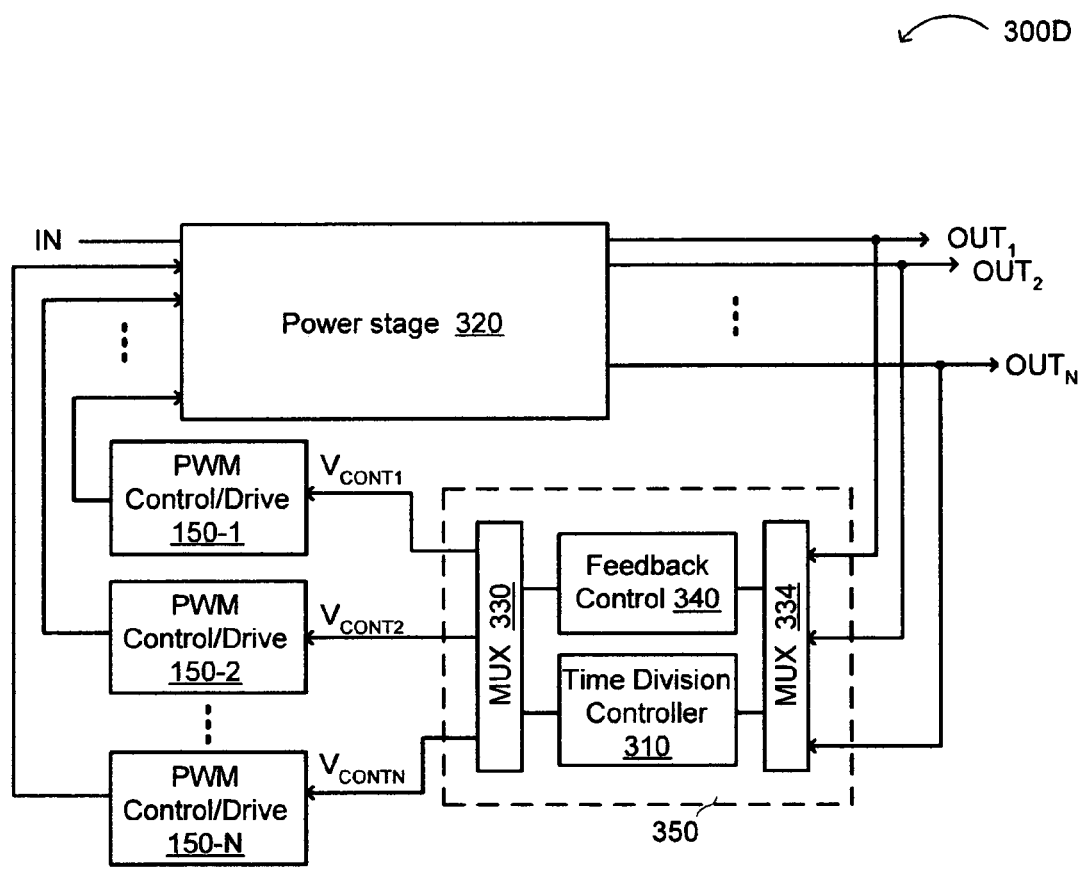
FIG. 3D is a block schematic diagram of a second example regulator for N outputs in accordance with embodiments of the present invention.

Referring now to FIG. 3D, shown is a block schematic diagram 300D of a second example regulator for N outputs in accordance with embodiments of the present invention. In this example, common block 350 can include various types of circuitry. For example, common feedback control 340 can include both linear amplifiers (e.g., for DC regulation), as well as non-linear circuitry (e.g., for transient/AC operation). The particular example of FIG. 3D may be best suited for relatively low-cost applications whereby TDM can be used for both DC (steady state) and AC (transient) regulation because transient response times may not be quite as critical.

The time division circuits as discussed herein can divide one sense period into multiple time durations for common sub-circuits to be adapted to each output channel having a same duration. The sense period can be one switching cycle, divided into a same number of time intervals as the number of output channels. The sense period can also include multiple switching periods when the common sub-circuits are adapted to one output channel in one switching period. Particular embodiments are also amenable to other ways to divide the sense period, depending on the application requirements.

Exemplary Methods of Controlling a Switching Regulator

In another example, a method of controlling a switching regulator includes: (i) amplifying a regulation difference between an output terminal and a regulation reference using a first feedback circuit; (ii) generating a control signal from the amplified difference for steady state operation of the switching regulator; (iii) sensing the regulation difference between the output terminal and the regulation reference using a second feedback circuit; and (iv) generating an adjustment signal for adjusting the control signal under transient conditions to improve a transient response of the switching regulator.

Figure 4A:
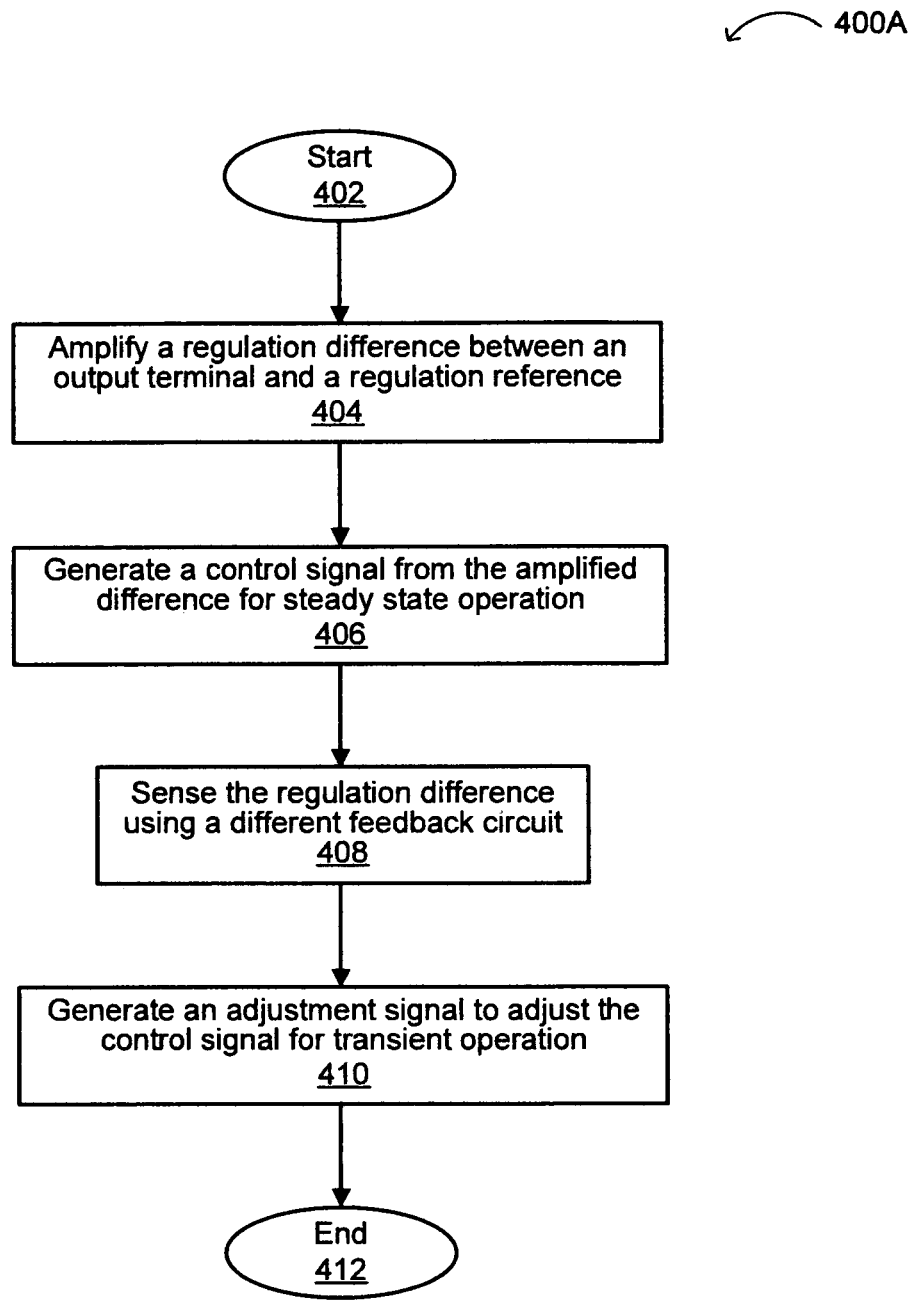
FIGS. 4A and 4B are flow diagrams showing example methods of controlling switching regulators in accordance with embodiments of the present invention.

Referring now to FIG. 4A, shown is a flow diagram 400A of an example method of controlling a switching regulator in accordance with embodiments of the present invention. The flow begins (402), and a regulation difference between an output terminal and a regulation reference can be amplified (404), such as via EA 208. A control signal (e.g., $V_{CONT}$) can then be generated from the amplified difference for steady state operation (406). The regulation difference can also be sensed using a different feedback circuit (408), such as non-linear circuit 204. An adjustment signal (e.g., $V_{ADJ}$) can then be generated to adjust the control signal for transient operation (410), completing the flow (412).

In another example, a method of controlling a multiple output switching regulator includes: (i) dividing a sensing period into a plurality of time intervals; (ii) amplifying an output regulation difference between each of a plurality of output terminals and a corresponding regulation reference using a first common feedback circuit; (iii) generating a corresponding control signal in a corresponding time intervals, where the corresponding control signal is held until a next sensing interval; and (iv) using each control signal to produce a stable output level at the corresponding output terminal to match the corresponding regulation reference during steady state operation.

Figure 4B:
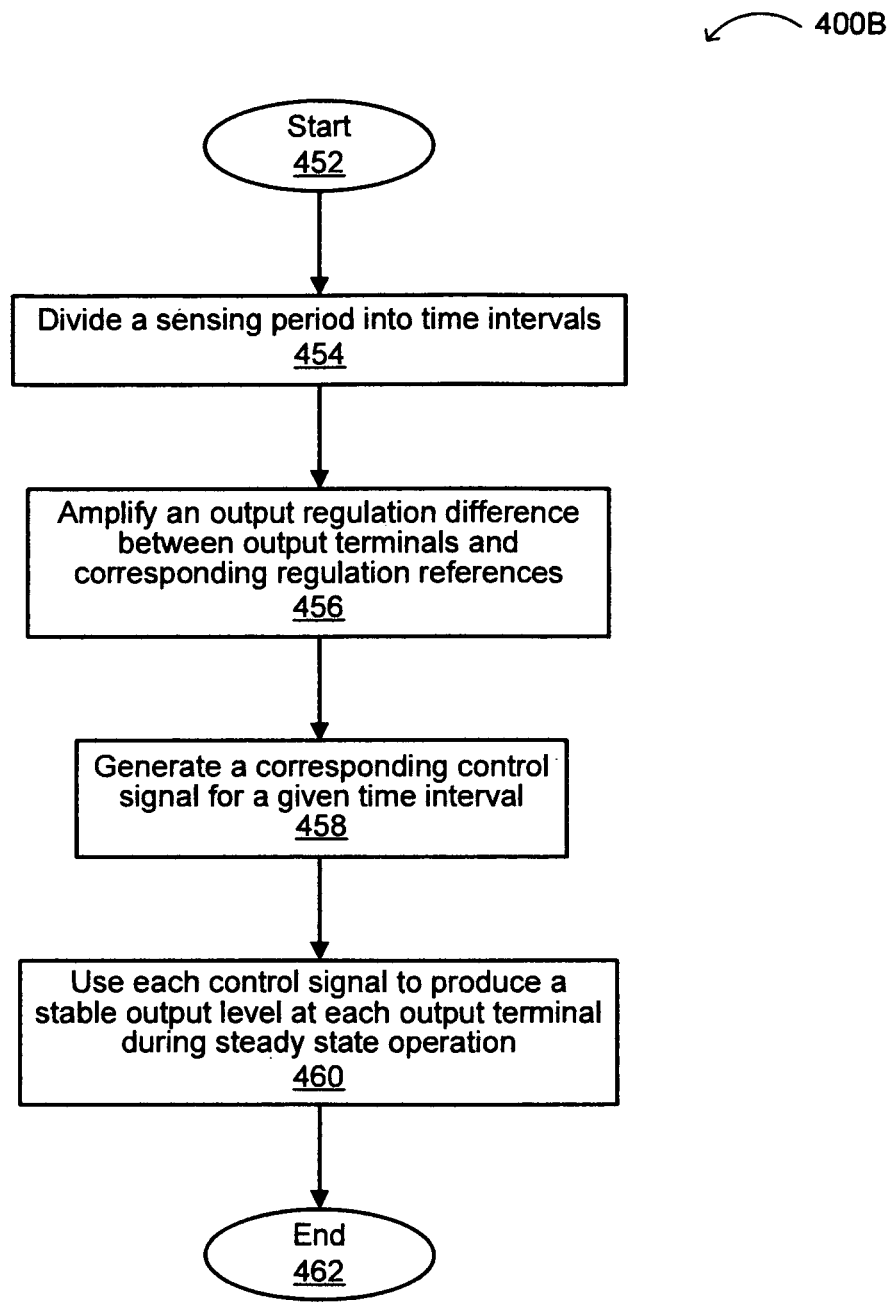

Referring now to FIG. 4B, shown is a flow diagram 400B of an example method of controlling a multiple output switching regulator in accordance with embodiments of the present invention. The flow can begin (452), and a sensing period can be divided into time intervals (454), such as via time division controller 310. An output regulation difference between output terminals and corresponding regulation references can be amplified (456), such as via transconductance amplifier 304. A corresponding control signal (e.g., $V_{CONT1}, V_{CONT2}, \ldots V_{CONTN}$) can be generated for a given time interval (458). Each control signal can then be used to produce a stable output level at each output terminal (e.g., $OUT_1, OUT_2, \ldots OUT_N$) during steady state operation (460), completing the flow (462).

As shown in various examples herein, regulators employ an inductor-based switching regulator topology. However, any suitable type of regulator (e.g., linear regulators, transformer-based switching regulators, charge pump regulator circuit topologies, boost regulator, buck-boost, flyback, etc.) can be used in certain embodiments. In addition, particular amplifiers (e.g., linear amplifiers) are shown in examples herein, but other types of amplifiers, such as digital amplifiers, can be used for various feedback circuitry in particular embodiments. In addition, control methods in circuitry described herein can be applied to regulators with any output signals (e.g., constant current, AC voltage, AC current), as opposed to strictly being applied to constant voltage applications.

Any suitable input and regulated output voltages can be accommodated in particular embodiments. For example, in a buck step down type of regulator, an input voltage can range from about 2.5 V to about 5.5 V, such as from about 2.7 to about 4.2 V, and including about 4.2 V. Regulated output voltages in such a step down regulator example can range from about 0.8 V to abut 2.2 V, and including from about 1 V to about 1.8 V, and more specifically about 1.5 V. For example, some such voltages can apply in a cell phone application, and can be utilized for main chip power, random-access memory (RAM) power, or the like.

While the above examples include circuit and structural implementations of certain regulators, one skilled in the art will recognize that other technologies and/or regulator structures can be used in accordance with embodiments. Further, one skilled in the art will recognize that other device circuit arrangements, elements, and the like, may also be used in accordance with embodiments. Also, while control circuitry described above can be implemented using AND-gates, OR-gates, S-R flip-flops, detectors, comparators, and/or amplifiers, particular embodiments are also applicable to other circuit components. Also, methods and circuits discussed herein can also be applied to different switching devices (e.g., a PMOS transistor, BJT devices, etc.), and to different topologies (e.g., forward, half bridge, full bridge, etc.) converters.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A switching regulator controller, comprising:
a) a first feedback circuit configured to sense an output of a switching regulator for comparison against a regulation reference, and to generate a control signal suitable for matching said output of said switching regulator to said regulation reference during a steady state operation of said switching regulator; and
b) a second feedback circuit configured to sense a plurality of regulation differences between said output and a plurality of predetermined thresholds based on said regulation reference, and to generate a single adjustment signal in response to said plurality of regulation differences, said single adjustment signal being configured to adjust said control signal under transient conditions to adjust a duty cycle of a power stage of said switching regulator to improve transient responses of said switching regulator;
c) wherein said second feedback circuit comprises a non-linear circuit configured to sense at least one of said plurality of regulation differences via a transconductance amplifier coupled to a resistor, wherein an output of said resistor and said transconductance amplifier are coupled to inputs of an analog-digital converter (ADC), wherein said ADC is configured to provide a digital signal to a digital filter, wherein an output of said digital filter is coupled to a digital-to-analog converter (DAC), wherein said DAC is configured to provide said single adjustment signal.

2. The switching regulator controller of claim 1, wherein said first feedback circuit comprises a linear amplifier.

3. The switching regulator controller of claim 1, further comprising a user interface control, wherein said digital filter is configured to be programmed via said user interface control.

4. The switching regulator controller of claim 1, wherein said second feedback circuit comprises a first comparison circuit that is configured to compare said output against a first of said plurality of predetermined thresholds to determine a first of said plurality of regulation differences, and to adjust said single adjustment signal in response thereto.

5. The switching regulator controller of claim 4, wherein said second feedback circuit further comprises a second comparison circuit that is configured to compare said output against a second of said plurality of predetermined thresholds to determine a second of said plurality of regulation differences, and to adjust said single adjustment signal in response thereto.

6. The switching regulator controller of claim 1, further comprising driver logic, wherein said output of said digital filter is coupled to said driver logic to supplement said control signal.

7. The switching regulator controller of claim 1, wherein said second feedback circuit further comprises an analog control circuit that is configured to amplify differences between said output and said plurality of predetermined thresholds to determine said plurality of regulation differences, and to correspondingly adjust said single adjustment signal, wherein each said corresponding adjustment comprises a different transfer function.

8. The switching regulator controller of claim 1, further comprising first and second summation circuits, wherein said second summation circuit is configured to sum said single adjustment signal with said control signal prior to controlling said output of said switching regulator.

9. A multiple output switching regulator controller, comprising:
a) a power stage configured to power a plurality of loads by providing a corresponding plurality of output terminals at a corresponding plurality of different output voltages by converting an input signal, wherein said plurality of output terminals are not connected together; and
b) a first feedback circuit configured to amplify an output regulation difference between each said output terminal and a corresponding regulation reference using time division multiplexing (TDM), said first feedback circuit being configured to generate a plurality of control signals corresponding to said plurality of output terminals, each said control signal being generated during a predetermined time interval using said TDM, and each said control signal being held until a next sensing interval, wherein each said control signal is configured to control said switching regulator to match a corresponding output terminal to said corresponding regulation reference during a steady state operation of said switching regulator,
c) wherein said first feedback circuit comprises a single linear amplifier having an amplifier input and an amplifier output, wherein said amplifier input is coupled to a first multiplexor coupled to said plurality of output terminals, wherein said amplifier output is coupled to a second multiplexor coupled to a plurality of compensation signals corresponding to said plurality of control signals.

10. The multiple output switching regulator controller of claim 9, further comprising a plurality of second feedback circuits corresponding to each output terminal, wherein each said second feedback circuit is configured to sense a plurality of regulation differences between said corresponding output terminal and a plurality of predetermined thresholds based on said regulation reference, to generate a corresponding adjustment signal to adjust said corresponding control signal for said corresponding output terminal under transient conditions to improve a transient response of said switching regulator.

11. The multiple output switching regulator controller of claim 10, wherein said second feedback circuit comprises a first comparison circuit that is configured to compare said output terminal against a first of said plurality of predetermined thresholds, and to adjust said adjustment signal in response thereto.

12. The multiple output switching regulator controller of claim 11, wherein said second feedback circuit further comprises a second comparison circuit that is configured to compare said output terminal against a second of said plurality of predetermined thresholds, and to adjust said adjustment signal in response thereto.

13. The multiple output switching regulator controller of claim 10, wherein said second feedback circuit further comprises a digital control circuit that is configured to convert said regulation difference into a digital signal for adjusting said adjustment signal.

14. The multiple output switching regulator controller of claim 10, wherein said second feedback circuit further comprises an analog control circuit that is configured to compare said output terminal against a corresponding threshold of said plurality of thresholds, and to correspondingly adjust each said adjustment signal, wherein each said corresponding adjustment comprises a different transfer function.

15. A method of controlling a switching regulator, the method comprising:
a) amplifying a first regulation difference between an output terminal and a regulation reference using a first feedback circuit;
b) generating a control signal from said amplified difference for steady state operation of said switching regulator;
c) sensing a plurality of second regulation differences between said output terminal and a plurality of predetermined thresholds based on said regulation reference using a second feedback circuit; and
d) generating a single adjustment signal for adjusting said control signal under transient conditions to adjust a duty cycle of a power stage of said switching regulator to improve a transient response of said switching regulator, wherein the single adjustment signal is generated from the plurality of second regulation differences, wherein said second feedback circuit comprises a non-linear circuit that senses at least one of said plurality of second regulation differences via a transconductance amplifier coupled to a resistor, wherein an output of said resistor and said transconductance amplifier are coupled to inputs of an analog-to-digital converter (ADC), said ADC providing a digital signal to a digital filter, wherein an output of said digital filter is coupled to a digital-to-analog converter (DAC), said DAC providing said single adjustment signal.

16. A method of controlling a multiple output switching regulator, the method comprising:

a) dividing a sensing period into a plurality of time intervals;
b) amplifying an output regulation difference between each of a plurality of output terminals and a corresponding regulation reference using a first common feedback circuit, wherein said plurality of output terminals are not connected together and are at a corresponding plurality of different output voltages;
c) generating a corresponding control signal in a corresponding time interval, wherein said corresponding control signal is held until a next sensing interval of said plurality of time intervals; and
d) using each said control signal to produce a stable output level at said corresponding output terminal to match said corresponding regulation reference during steady state operation, wherein said first feedback circuit comprises a single linear amplifier having an amplifier input and an amplifier output, wherein said amplifier input is coupled to a first multiplexor coupled to said plurality of output terminals, wherein said amplifier output is coupled to a second multiplexor coupled to compensation signals corresponding to said control signals.

17. The method of claim 16, further comprising:
a) sensing a plurality of regulation differences for each said output terminal using a corresponding second feedback circuit; and
b) generating a corresponding single adjustment signal from said sensed plurality of regulation differences for adjusting said corresponding control signal to improve transient responses of said switching regulator.

18. The method of claim 16, further comprising:
a) sensing a plurality of regulation differences between each output terminal and a plurality of predetermined thresholds based on said regulation reference using a common second feedback circuit to each output terminal and time division multiplexing (TDM); and
b) generating a corresponding single adjustment signal from said sensed plurality of regulation differences in a given time interval of said TDM for adjusting said corresponding control signal to improve transient responses of said switching regulator.

19. The method of claim 16, further comprising dividing one switching period of said switching regulator into a plurality of time intervals, wherein each said time interval corresponds to one of said plurality of output terminals.

20. The method of claim 16, wherein each of said plurality of time periods corresponds to a sensing time interval for a corresponding output terminal.

* * * * *